(12) United States Patent
Hester et al.

(10) Patent No.: US 7,343,430 B2
(45) Date of Patent: Mar. 11, 2008

(54) METHODS AND APPARATUS FOR IMPROVING DATA INTEGRITY FOR SMALL COMPUTER SYSTEM INTERFACE (SCSI) DEVICES

(75) Inventors: Jeffrey Richards Hester, Mantorville, MN (US); Brian Lee Morger, Preston, MN (US); Shad Henry Thorstenson, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 305 days.

(21) Appl. No.: 10/834,451

(22) Filed: Apr. 29, 2004

(65) Prior Publication Data
US 2005/0246454 A1    Nov. 3, 2005

(51) Int. Cl.
*G06F 3/00* (2006.01)
(52) U.S. Cl. ............ 710/5; 710/2; 710/9; 709/209
(58) Field of Classification Search ........... 710/36, 710/2, 3, 5, 9
See application file for complete search history.

(56) References Cited

U.S. PATENT DOCUMENTS

| | | | | |
|---|---|---|---|---|
| 5,247,622 A | * | 9/1993 | Choi | 710/114 |
| 5,261,105 A | * | 11/1993 | Potter et al. | 710/105 |
| 5,367,647 A | * | 11/1994 | Coulson et al. | 710/105 |
| 5,528,765 A | * | 6/1996 | Milligan | 710/107 |
| 5,613,076 A | * | 3/1997 | Latif et al. | 710/113 |
| 5,809,279 A | * | 9/1998 | Oeda et al. | 711/153 |
| 5,938,776 A | * | 8/1999 | Sicola et al. | 714/25 |
| 6,430,632 B1 | | 8/2002 | Ain et al. | |
| 6,775,702 B2 | * | 8/2004 | Oeda et al. | 709/226 |
| 7,003,589 B2 | * | 2/2006 | Erickson et al. | 710/8 |
| 2002/0174377 A1 | * | 11/2002 | Davies | 714/6 |

* cited by examiner

*Primary Examiner*—Kim Huynh
*Assistant Examiner*—Dean Phan
(74) *Attorney, Agent, or Firm*—John J. Oskorep, Esq.; Patrick Duncan (57) ABSTRACT

A SCSI ID of a SCSI initiator device that has won an arbitration is identified on a SCSI bus and stored in a register at a SCSI device. Subsequently, a SCSI ID of a selected SCSI target device which was selected by the SCSI initiator device is identified on the SCSI bus and compared with the SCSI ID in the register. If the SCSI ID of the selected SCSI target device and the SCSI ID stored in the register are different, a SCSI command from the SCSI initiator device is processed by the selected SCSI target device. If the SCSI ID of the selected SCSI target device and the SCSI ID stored in the register are the same, the selected SCSI target device refrains from processing the SCSI command from the SCSI initiator device.

26 Claims, 5 Drawing Sheets

FIG. 1

– PRIOR ART –

FIG. 2

-- PRIOR ART --

FIG. 3

METHODS AND APPARATUS FOR IMPROVING DATA INTEGRITY FOR SMALL COMPUTER SYSTEM INTERFACE (SCSI) DEVICES

BACKGROUND OF THE INVENTION

1. Field of the Invention

The present invention relates to methods and apparatus for improving data integrity for small computer system interface (SCSI) devices.

2. Description of the Related Art

A small computer system interface (SCSI) is a well known and widely used type of interface for computer and data storage devices. A SCSI is generally used to couple a computer system to a device or to couple devices together for communications. Communications are provided between the computer system and the device or between devices through a SCSI interface using a SCSI protocol. SCSI communication generally works very well and is commercially popular. However, a particular data integrity problem with the SCSI protocol has been found when a SCSI "initiator" device is assigned with the same SCSI ID as an SCSI "target" device. This problem will be described in detail with respect to FIGS. 1 and 2.

Figure 1:
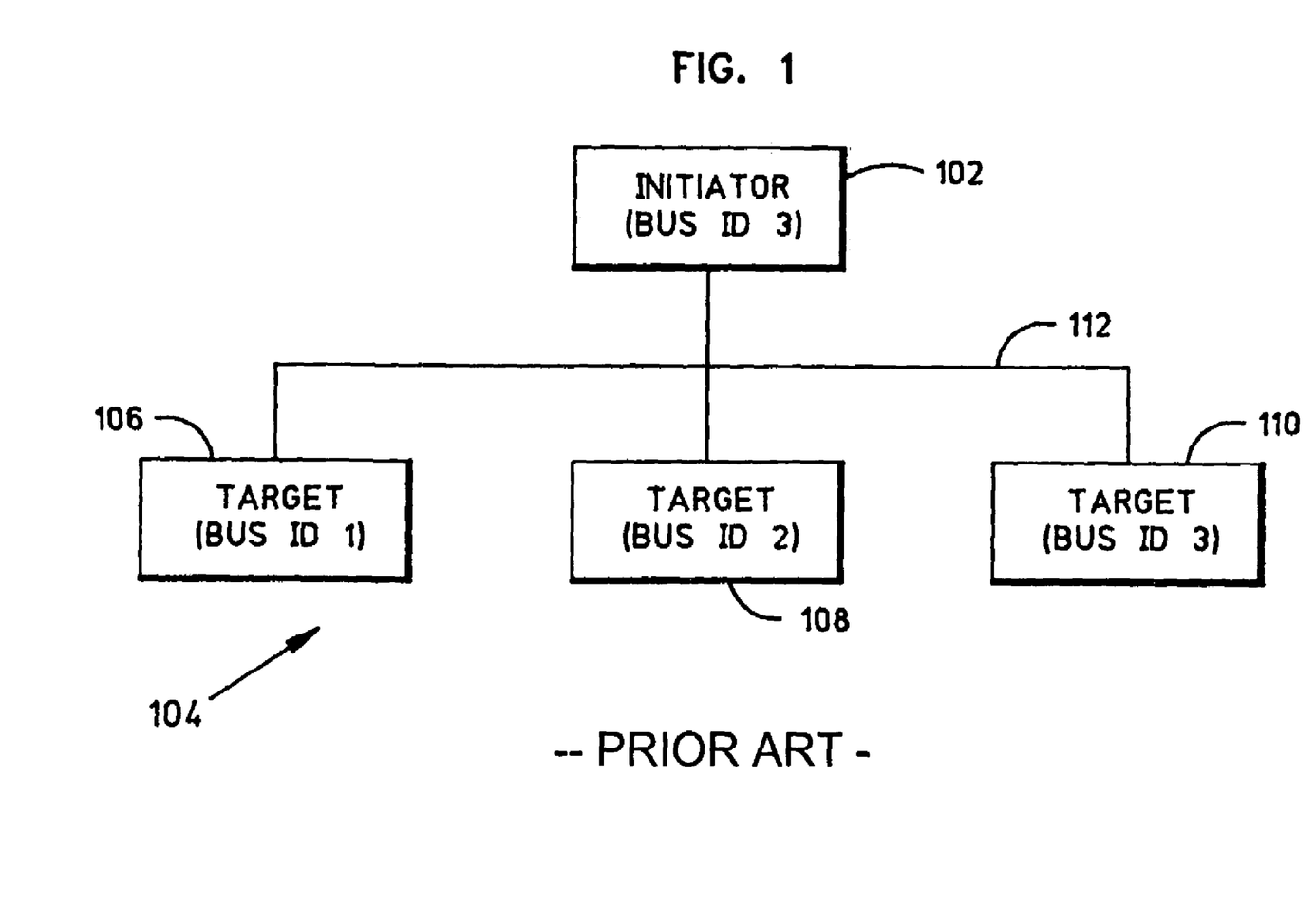
FIG. 1 is an illustrative representation of a SCSI initiator device coupled to a plurality of SCSI target devices via a SCSI bus, for illustrating a problem of SCSI data integrity.

FIG. 1 is an illustrative representation of a SCSI initiator device 102 and a plurality of SCSI target devices 104. SCSI initiator device 102 and the plurality of SCSI target devices 104 are coupled together for communication via a SCSI bus 112. SCSI initiator device 102 may be a computer or server and SCSI target devices 104 may be hard disk drives, for example. In this example, there are three (3) SCSI target devices 104 which include SCSI target devices 106, 108, and 110. Each SCSI device 102, 106, 108, and 110 is assigned a SCSI ID. In this example, SCSI initiator device 102 is assigned SCSI ID=3, SCSI target device 106 is assigned SCSI ID=1, SCSI target device 108 is assigned SCSI ID=2, and SCSI target device 110 is assigned SCSI ID=3. Note that SCSI initiator device 102 is assigned with the same SCSI ID as SCSI target device 110 (i.e. SCSI ID=3).

If SCSI initiator device 102 selects SCSI target device 108, for example, SCSI target device 110 will undesirably respond to the selection intended for SCSI target device 108. When this occurs, there is no conventional mechanism which prevents the wrong target (e.g. SCSI target device 110) from taking control of SCSI bus 112 and completing the SCSI protocol which includes Command, Data, and Status phases. If the SCSI command intended for SCSI target device 108 is a WRITE command (e.g. SCSI opcodes 0x0A, 0x2A, 0x2E, 0x3F, 0x41), data on the media of SCSI target device 110 is corrupted with data intended to be written at SCSI target device 108. If the SCSI command intended for SCSI target device 108 is a READ command (SCSI opcodes 0x08, 0x28, 0x3E), data from SCSI target device 110 would be returned to SCSI initiator device 102. In both cases, data integrity has been compromised. Even other SCSI commands will compromise data integrity with this scenario.

Figure 2:
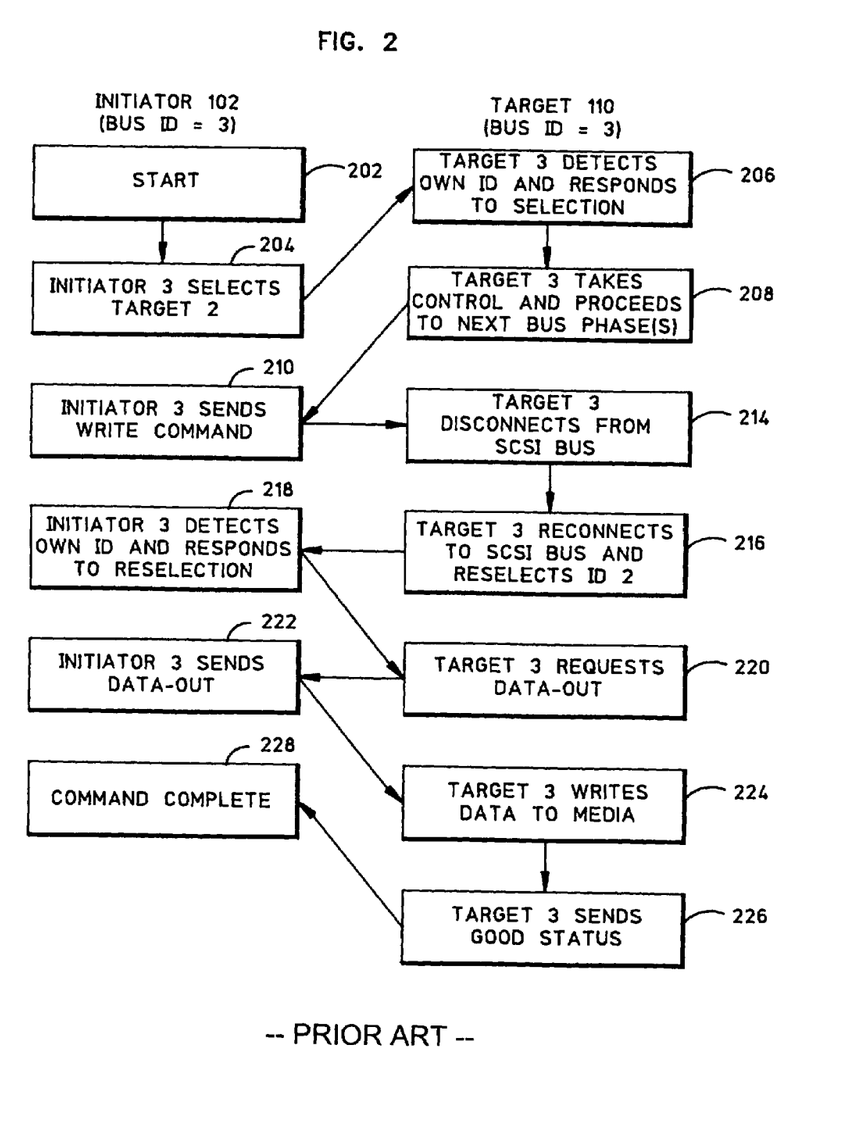
FIG. 2 is a flowchart which describes the problem of SCSI data integrity in more detail.

FIG. 2 is a flowchart which describes the data integrity problem in further detail. FIGS. 1 and 2 will be referred to in combination in the following description. Beginning at a start block 202 of FIG. 2, SCSI initiator device 102 having SCSI ID=3 selects SCSI target device 108 having SCSI=2 on SCSI bus 112 (step 204 of FIG. 2). In response, SCSI target device 110 having SCSI=3 detects its own SCSI ID on SCSI bus 112 and responds to the selection (step 206 of FIG. 2). In effect, SCSI target device 110 "thinks" it has been selected by SCSI initiator device 102. SCSI target device 110 therefore takes control over SCSI bus 112 and proceeds to the next bus phase(s) (step 208 of FIG. 2). Next, SCSI initiator device 102 transmits a WRITE command on SCSI bus 112 (step 210). In response, SCSI target device 110 completes "Message Out" and "Command" phases for the write and disconnects from SCSI bus 112 (step 214 of FIG. 2). SCSI target device 110 then prepares its buffers, reconnects to SCSI bus 112, and selects SCSI target device 108 having SCSI ID=2 (step 216 of FIG. 2). In response, SCSI initiator device 110 having SCSI ID=3 detects its own SCSI ID on SCSI bus 112, thinking that SCSI target device 110 has reselected it, and responds to the reselection (step 218 of FIG. 2). SCSI target device 110 is now connected to SCSI initiator device 102. SCSI target device 110 then requests "Data-Out" for the WRITE command (step 220 of FIG. 2). In response, SCSI initiator device 102 writes data to the media (e.g. a disk) at SCSI target device 110 (step 222 of FIG. 2). After completion, SCSI target device 110 responds with a "Good Status" indication to SCSI initiator device 110 (step 226 of FIG. 2) and Command Complete (step 228 of FIG. 2). As apparent, SCSI target device 110 has been undesirably corrupted with data not intended to be written to it.

Accordingly, there is an existing need to overcome these and other deficiencies of the prior art.

SUMMARY

Methods and apparatus for improved data integrity for small computer system interface (SCSI) devices are described herein. In one illustrative example of the present invention, a SCSI ID of a SCSI initiator device that has won an arbitration is identified on a SCSI bus and stored in a register at a SCSI device. Subsequently, a SCSI ID of a selected SCSI target device which was selected by the SCSI initiator device is identified on the SCSI bus and compared with the SCSI ID in the register. If the SCSI ID of the selected SCSI target device and the SCSI ID stored in the register are different, a SCSI command from the SCSI initiator device is processed by the selected SCSI target device. If the SCSI ID of the selected SCSI target device and the SCSI ID stored in the register are the same, the selected SCSI target device refrains from processing the SCSI command from the SCSI initiator device.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Methods and apparatus for improved data integrity for small computer system interface (SCSI) devices are described herein. In one illustrative example of the present invention, a SCSI ID of a SCSI initiator device that has won an arbitration is identified on a SCSI bus and stored in a register at a SCSI device. Subsequently, a SCSI ID of a selected SCSI target device which was selected by the SCSI initiator device is identified on the SCSI bus and compared with the SCSI ID in the register. If the SCSI ID of the selected SCSI target device and the SCSI ID stored in the register are different, a SCSI command from the SCSI initiator device is processed by the selected SCSI target device. If the SCSI ID of the selected SCSI target device and the SCSI ID stored in the register are the same, the selected SCSI target device refrains from processing the SCSI command from the SCSI initiator device.

The following description represents several embodiments presently contemplated for carrying out the present invention. This description is made for the purpose of illustrating the general principles of the present invention and is not meant to limit the inventive concepts claimed herein.

Figure 3:
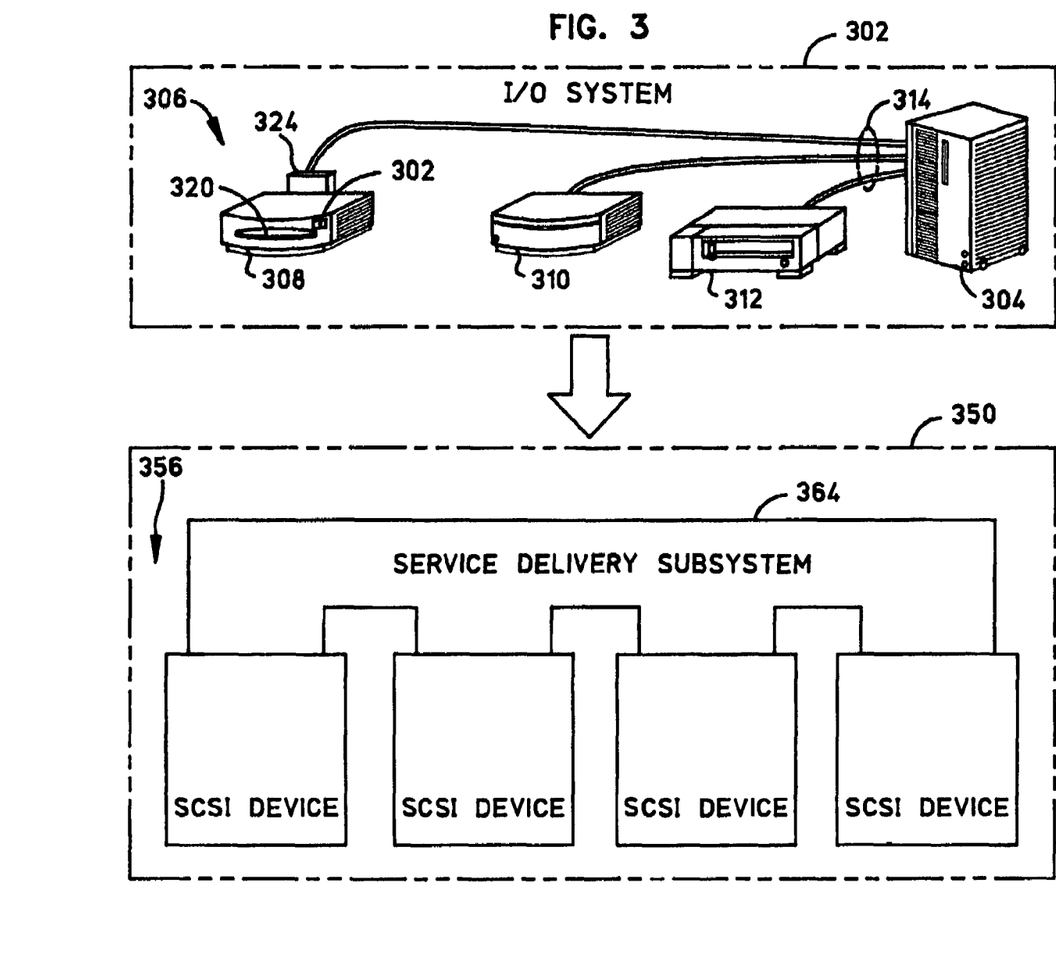
FIG. 3 is an illustrative representation of a SCSI initiator device coupled to a plurality of SCSI target devices via a SCSI bus, the environment within which the present invention may be embodied.

FIG. 3 is an illustrative representation of a system 302 having improved data integrity for small computer system interface (SCSI) devices. System 302 includes a SCSI initiator device 304 and a plurality of SCSI target devices 306. SCSI initiator device 304 and the plurality of SCSI target devices 306 are coupled together for communication via a SCSI bus 314. In this example, there are three (3) SCSI target devices 306 which include SCSI target devices 308, 310, and 312. Each SCSI device 304, 308, 310, and 312 is assigned a SCSI ID. Note that SCSI initiator device 304 may be assigned with the same SCSI ID as one of the SCSI target devices 306. SCSI initiator device 304 may be a computer or server and SCSI target devices 306 may be a SCSI data storage device, such as but not limited to a hard disk drive as depicted in FIG. 3. Each hard disk drive includes one or more hard disks, a hard disk controller (HDC), and an SCSI interface. For example, SCSI device 308 which is a hard disk drive includes one or more hard disks 320, a HDC 322, and an SCSI interface 324. System 302 is also illustrated with more generality in FIG. 3 in a system 350 depicted below it, which includes a plurality of SCSI devices 356 coupled via a service delivery subsystem 364 (e.g. a SCSI bus). Each SCSI device 356 includes at least a controller (such as a hard disk controller or HDC) and a SCSI interface.

The primary approach taken by the present invention involves storing the SCSI ID of the SCSI device that has won arbitration into a register of each SCSI device. The stored SCSI ID is used by each SCSI device in the configuration to ensure that it does not conflict with the SCSI ID of a selected SCSI device. If the SCSI IDs are in conflict (i.e. if they are equal), the selection phase is aborted by that particular (re)selected SCSI device; otherwise the selection phase is continued for that (re)selected SCSI device. More particularly, an arbitration state machine of each SCSI device in the configuration identifies the SCSI ID of the winner of an arbitration phase on the SCSI bus and stores it in a register. This special register may be referred to as an ARBWIN register (ARBWIN being short for "arbitration winner"). During a subsequent (re)selection phase, a (re) selection state machine of each SCSI device in the configuration identifies whether its SCSI ID is on the SCSI bus to determine if it has been (re)selected. If the SCSI device detects that it has been (re)selected, it compares its SCSI ID against the SCSI ID stored in the ARBWIN register. If the SCSI IDs are equal, an invalid condition has been detected (i.e. the initiator and the target have the same SCSI ID) and the selection state machine is aborted until the next (re) selection occurs. Particularly, the SCSI device causes a (re)selection timeout to occur in response to the invalid condition, to thereby prevent it from being improperly (re)selected and continuing with the protocol. If the SCSI IDs are different, the selection state machine is continued and the SCSI protocol is followed as is conventional. Advantageously, the wrong SCSI device does not respond to SCSI commands (e.g. WRITE or READ commands) intended for a different SCSI device. Note that by using the language "(re)selection", reference is being made to either case of selection (initiator to target) or reselection (target to initiator); however, the specification and claims may recite the language "selection" to embrace either case.

With reference now to FIG. 3, assume that SCSI initiator device 304 won an arbitration during an arbitration phase. Each SCSI target device 306 stores the SCSI ID of SCSI initiator device 304 from SCSI bus 314 in its associated ARBWIN register. This register is accessible by and preferably contained in the controller (e.g. the HDC) of each SCSI device. Subsequently, a SCSI ID of a selected SCSI target device is identified on SCSI bus 314 by all SCSI target devices 306. If the SCSI ID of the selected SCSI target device on SCSI bus 314 and the SCSI ID of the SCSI device are the same, the SCSI ID of the selected SCSI target device and the SCSI ID stored in the ARBWIN register are compared. A SCSI command issued by SCSI initiator device 304 is processed by the selected SCSI device based on its determining that the SCSI ID of the selected target SCSI device and the SCSI ID stored in its ARBWIN register are different. On the other hand, the SCSI command issued by SCSI initiator device 304 is not processed based on determining that the SCSI ID of the selected target SCSI device and the SCSI ID stored in its ARBWIN register are the same.

Figure 4:
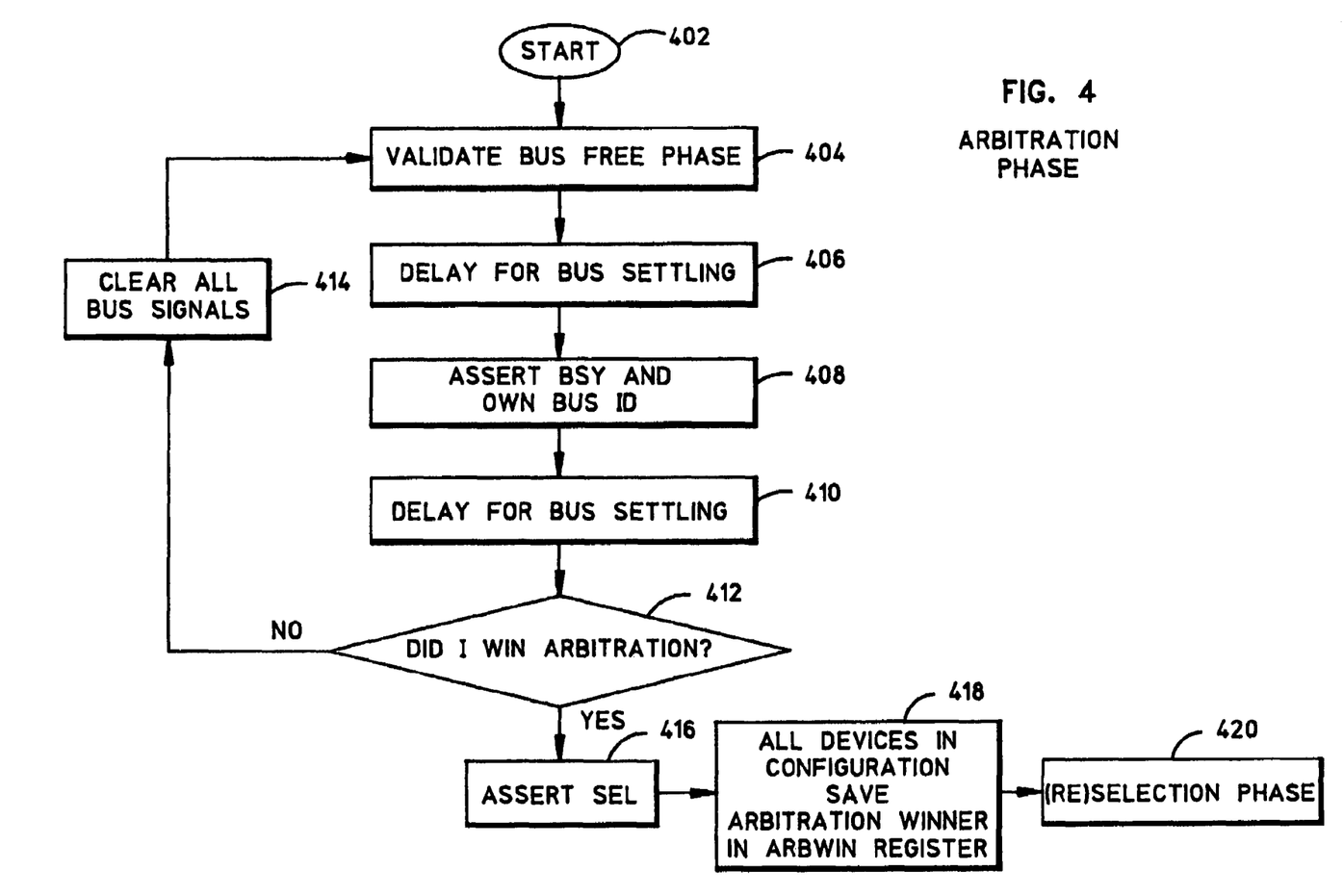
FIG. 4 is a first portion of a flowchart of FIGS. 4-5 which describes a method of improving data integrity for SCSI devices.

FIG. 4 is a first portion of a flowchart which describes a method of improving data integrity for SCSI devices in further detail. This first portion of the flowchart corresponds to a SCSI "arbitration phase" of the method. Beginning at a start block. 402, a bus free phase is validated by an SCSI device for the arbitration phase (step 404). After waiting a delay period for bus settling (step 406), the SCSI device asserts a BSY signal (i.e. "Busy" signal for bus being in-use) and its own SCSI ID on the SCSI bus (step 408). After waiting a delay period for bus settling (step 410), the SCSI device identifies whether it has won arbitration (step 412). If the SCSI device did not win the arbitration at step 412 ("No"), the SCSI device clears all of its signals on the SCSI bus (step 414) and the flowchart repeats back at step 404 for subsequent arbitrations. If the SCSI device won the arbitration at step 412 ("Yes"), the SCSI device asserts a SEL signal (i.e. "Selection" signal for particular SCSI device) and asserts its own SCSI ID on the SCSI bus (step 416). In response, each SCSI device in the configuration stores the SCSI ID of the arbitration winner in its associated ARBWIN register (step 418). The flowchart then proceeds to a (re) selection phase (step 420). Note that the method of FIG. 4 occurs for each arbitration performed in the configuration, where each SCSI device writes over the SCSI ID of the previous arbitration in the ARBWIN register.

Figure 5:
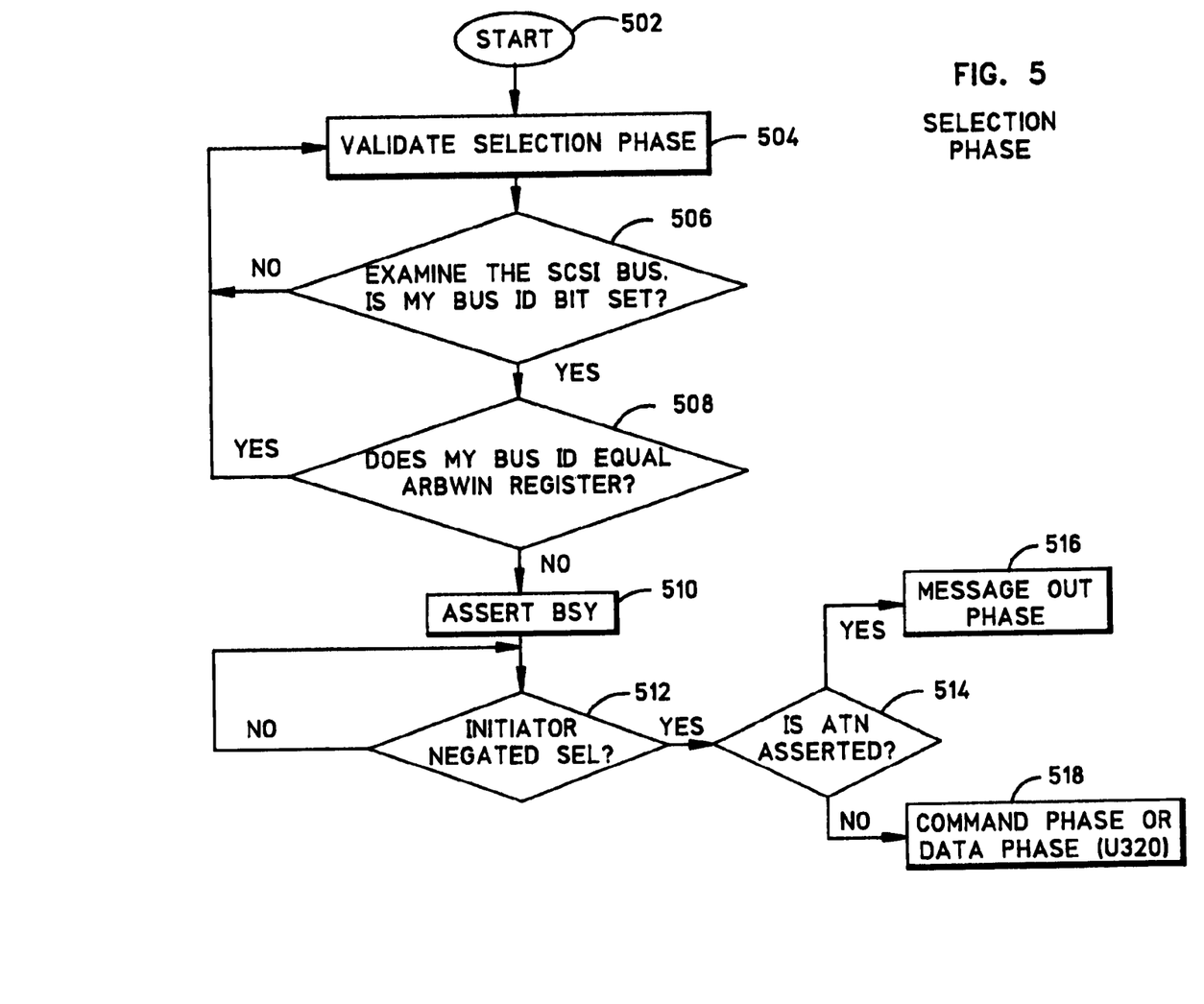
FIG. 5 is a second portion of the flowchart of FIGS. 4-5 which describes a method of improving data integrity for SCSI devices.

FIG. 5 is a second portion of the flowchart of FIG. 4 which describes a method of improving data integrity for SCSI devices in further detail. This second portion of the flowchart corresponds to a SCSI "selection phase" which immediately follows the arbitration phase. Beginning at a start block 502, a selection phase is validated by an SCSI device for the selection phase (step 504). A SCSI initiator device that has won the previous arbitration (e.g. see FIG. 4) selects one of the SCSI target devices by outputting the target SCSI ID on the SCSI bus. Each SCSI device in the configuration monitors the SCSI bus to determine whether it has been selected, that is, whether the SCSI ID on the SCSI bus matches its own SCSI ID (step 506). If the SCSI device has not been selected at step 506 (i.e. its SCSI ID is not on the SCSI bus), then the flowchart repeats beginning again at step 504 for subsequent selections. If the SCSI device, has been selected at step 506 (i.e. if its SCSI ID is on the SCSI bus), then the SCSI device compares its SCSI ID with the SCSI ID stored in its ARBWIN register (step 508).

If the SCSI IDs are the same at step 508, then the SCSI device aborts the selection phase and the flowchart repeats beginning again at step 504 for subsequent selections. Specifically, the SCSI target device causes a selection timeout to occur in response to the invalid condition, to prevent it from being improperly selected and continuing with the protocol. Any subsequent SCSI command (e.g. WRITE or READ command) from the SCSI initiator device will be ignored by the SCSI device. If the SCSI IDs are different at step 508, however, then the SCSI continues with the selection phase as is conventional though steps 512, 514, 516, and 518. In particular, the SCSI device identifies whether the SCSI initiator device has negated the SEL signal on the SCSI bus (step 512) and, when it has, it continues to step 514. In step 514, the SCSI device identifies whether the SCSI initiator device has asserted an ATN signal (i.e. "Attention" signal for message ready) on the SCSI bus. If the ATN signal is asserted at step 514, then the SCSI device proceeds to the "Message Out" phase in step 516. If the ATN signal is not asserted at step 514, then the SCSI device proceeds to the "Command Phase" or "Data Phase" in step 518. Such subsequent conventional steps may include the processing of a WRITE command or a READ command, for example.

Methods and apparatus for improved data integrity for small computer system interface (SCSI) devices have been described. In one illustrative example of the present invention, a SCSI ID of a SCSI initiator device that has won an arbitration is identified on a SCSI bus and stored in a register at a SCSI device. Subsequently, a SCSI ID of a selected SCSI target device which was selected by the SCSI initiator device is identified on the SCSI bus and compared with the SCSI ID in the register. If the SCSI ID of the selected SCSI target device and the SCSI ID stored in the register are different, a SCSI command from the SCSI initiator device is processed by the selected SCSI target device. If the SCSI ID of the selected SCSI target device and the SCSI ID stored in the register are the same, the selected SCSI target device refrains from processing the SCSI command from the SCSI initiator device.

Thus, a method of the present invention may include the acts of identifying, on a SCSI bus at a SCSI device, a SCSI ID of a selected SCSI target device; and if the SCSI ID of the selected SCSI target device and the SCSI ID of the SCSI device are the same: comparing the SCSI ID of the selected SCSI target device and a SCSI ID corresponding to a SCSI initiator device stored in a register at the SCSI device; processing a SCSI command from the SCSI initiator device based on determining that the SCSI ID of the selected target SCSI device and the SCSI ID stored in the register are different; and refraining from processing the SCSI command from the SCSI initiator device based on determining that the SCSI ID of the selected target SCSI device and the SCSI ID stored in the register are the same.

A system of the present invention which utilizes SCSI communication includes a SCSI initiator device; a plurality of SCSI target devices; and a SCSI bus for coupling the SCSI initiator device and the plurality of SCSI target devices through SCSI interfaces of the devices. The SCSI initiator device is adapted to assert its SCSI ID on the SCSI bus after winning an arbitration for control over the SCSI bus. At least one of the SCSI target devices is adapted to store the SCSI ID of the SCSI initiator device in a register; identify, on the SCSI bus, a SCSI ID of a selected SCSI target device which was selected by the SCSI initiator device; compare the SCSI ID of the selected SCSI target device and a SCSI ID of the SCSI target device; and if a match exists between the SCSI ID of the selected SCSI target device and the SCSI ID of the SCSI target device: compare the SCSI ID of the selected SCSI target device and the SCSI ID stored in the register; process a SCSI command from the SCSI initiator device if the SCSI ID of the selected target SCSI device and the SCSI ID stored in the register are different; and refrain from processing the SCSI command from the SCSI initiator device if a match exists between the SCSI ID of the selected target SCSI device and the SCSI ID stored in the register.

A disk drive of the present invention includes one or more disks; a controller; and a SCSI interface for coupling to the controller and to a SCSI bus. The controller is adapted to compare a SCSI ID of the selected SCSI target device on the SCSI bus and a SCSI ID of the SCSI device and, if the SCSI ID of the selected SCSI target device and the SCSI ID of the SCSI device are determined to be the same: compare the SCSI ID of a selected SCSI target device on the SCSI bus and a SCSI ID corresponding to a SCSI initiator device stored in a register which is accessible by the controller; process a SCSI command from the SCSI initiator device if no match exists between the SCSI ID of the selected target SCSI device and the SCSI ID stored in the register; and refrain from processing the SCSI command from the SCSI initiator device if a match exists between the SCSI ID of the selected target SCSI device and the SCSI ID stored in the register.

It is to be understood that the above is merely a description of preferred embodiments of the invention and that various changes, alterations, and variations may be made without departing from the true spirit and scope of the invention as set for in the appended claims. Note that by using the language "(re)selection", reference is being made to either case of selection (initiator to target) or reselection (target to initiator); however, the specification and claims may recite the language "selection" to embrace either case. Few if any of the terms or phrases in the specification and claims have been given any special meaning different from their plain language meaning, and therefore the specification is not to be used to define terms in an unduly narrow sense.

What is claimed is:

1. A method for use in improving data integrity for small computer system interface (SCSI) devices, the method comprising the acts of:

identifying, on a SCSI bus at a SCSI device, a SCSI ID of a SCSI initiator device that has won an arbitration;

storing the SCSI ID in a register at the SCSI device;

identifying, on the SCSI bus at the SCSI device during a selection phase following the arbitration, a SCSI ID of a selected SCSI target device of the SCSI initiator device that won the arbitration;

comparing, during the selection phase, the SCSI ID of the selected SCSI target device and a SCSI ID of the SCSI device;
performing the following acts by the SCSI device if the SCSI ID of the selected SCSI target device and the SCSI ID of the SCSI device are identified to be the same from the comparing:
comparing the SCSI ID of the SCSI device and the SCSI ID stored in the register;
processing a SCSI command from the SCSI initiator device if the SCSI ID of the SCSI device and the SCSI ID stored in the register are identified to be different from the comparing; and
otherwise aborting processing associated with the SCSI initiator device without processing any SCSI command from the SCSI initiator device if the SCSI ID of the SCSI device and the SCSI ID stored in the register are identified to be the same from the comparing, so as to prevent wrongful processing by the SCSI device when the SCSI device mistakenly identifies the SCSI ID of the SCSI initiator device as the SCSI ID of the SCSI device during the selection phase.

2. The method of claim 1, wherein the SCSI device comprises a disk drive.

3. The method of claim 1, wherein the SCSI device comprises a hard disk drive and the method is employed in a hard disk controller (HDC) of the hard disk drive.

4. The method of claim 1, wherein the SCSI initiator device comprises a server.

5. The method of claim 1, further comprising:
repeating the acts of identifying, storing, comparing, and performing for each phase of a plurality of arbitration phases.

6. The method of claim 1, wherein the SCSI command comprises a WRITE command.

7. The method of claim 1, wherein the SCSI command comprises a READ command.

8. The method of claim 1, further comprising:
refraining from processing the SCSI command from the SCSI initiator device if, during the selection phase, the SCSI ID of the selected SCSI target device and the SCSI ID of the SCSI device are different as identified from the comparing.

9. The method of claim 1,
wherein the act of aborting processing associated with the SCSI initiator device comprises the further act of causing a selection timeout for processing to occur.

10. A method for use in improving data integrity for small computer system interface (SCSI) devices, comprising:
identifying, on a SCSI bus at a SCSI device during a selection phase, a SCSI ID of a selected SCSI target device that matches the SCSI ID of the SCSI device;
comparing, at the SCSI device, the SCSI ID of the SCSI device and a SCSI ID corresponding to a SCSI initiator device that won an arbitration prior to the selection phase; and
aborting processing associated with the SCSI initiator device by the SCSI device without processing any SCSI command from the SCSI initiator device based on determining that the SCSI ID of the SCSI device and the SCSI ID corresponding to the SCSI initiator device are the same from the act of comparing, so as to prevent wrongful processing by the SCSI device when the SCSI device mistakenly identifies the SCSI ID of the SCSI initiator device as its own SCSI ID during the selection phase.

11. The method of claim 10, further comprising:
identifying, on the SCSI bus at the SCSI device, the SCSI ID of the SCSI initiator device that has won the arbitration; and
storing the SCSI ID in a register at the SCSI device.

12. The method of claim 10, further comprising:
refraining from performing the comparing if, during the selection phase, the SCSI ID of the selected SCSI target device and the SCSI ID of the SCSI device are different.

13. The method of claim 10, further comprising:
processing a SCSI command from the SCSI initiator device based on determining that the SCSI ID of the selected target SCSI device and the SCSI ID corresponding to the SCSI initiator device which selected the selected SCSI target device are different from the act of comparing.

14. The method of claim 10, wherein the act of aborting processing associated with the SCSI initiator device comprises the further act of causing a selection timeout for processing to occur.

15. A disk drive, comprising:
one or more disks;
a controller;
a small computer system interface (SCSI) interface for coupling to a SCSI bus;
the controller being adapted to compare a SCSI ID of the selected SCSI target device on the SCSI bus and a SCSI ID of the disk drive during a selection phase and perform the following acts if the SCSI ID of the selected SCSI target device and the SCSI ID of the disk drive are determined by the disk drive to be the same from the comparing:
compare the SCSI ID of the disk drive and a SCSI ID corresponding to a SCSI initiator device stored in a register accessible to the controller, the SCSI initiator device having won an arbitration immediately prior to the selection phase;
process a SCSI command from the SCSI initiator device if no match exists between the SCSI ID of the disk drive and the SCSI ID stored in the register as identified from the comparing; and
otherwise abort processing associated with the SCSI initiator device without processing any SCSI command from the SCSI initiator device if a match exists between the SCSI ID of the disk drive and the SCSI ID stored in the register as identified from the comparing, so as to prevent wrongful processing by the disk drive when the controller of the disk drive mistakenly determines the SCSI ID of the SCSI initiator device to be the SCSI ID of the disk drive during the selection phase.

16. The disk drive of claim 15, wherein the SCSI command comprises a WRITE command.

17. The disk drive of claim 15, wherein the SCSI command comprises a READ command.

18. The disk drive of claim 15, wherein the SCSI initiator device comprises a computer or server.

19. A system which utilizes small computer system interface (SCSI) communications, comprising:
a SCSI initiator device;
a plurality of SCSI candidate target devices;
a SCSI bus for coupling the SCSI initiator device and the plurality of SCSI candidate target devices through SCSI interfaces;

the SCSI initiator device being adapted to assert its SCSI ID on the SCSI bus after winning an arbitration for control over the SCSI bus;

at least one of the SCSI candidate target devices being adapted to:
  store the SCSI ID of the SCSI initiator device in a register after the SCSI initiator device wins the arbitration;
  identify, on the SCSI bus during a selection phase following the arbitration, a SCSI ID of a selected SCSI target device from the SCSI initiator device;
  compare, during the selection phase, the SCSI ID of the selected SCSI target device and a SCSI ID of the SCSI candidate target device;
  perform the following acts if a match exists between the SCSI ID of the selected SCSI target device and the SCSI ID of the SCSI candidate target device as identified from the comparing:
    compare the SCSI ID of the SCSI candidate target device and the SCSI ID stored in the register;
    process a SCSI command from the SCSI initiator device if the SCSI ID of the SCSI candidate target device and the SCSI ID stored in the register are different as identified from the comparing; and
    otherwise abort processing associated with the SCSI initiator device without processing of any SCSI command from the SCSI initiator device if a match exists between the SCSI ID of the SCSI candidate target device and the SCSI ID stored in the register as identified from the comparing, so as to prevent wrongful processing by the SCSI candidate target device when the SCSI candidate target device mistakenly identifies the SCSI ID of the SCSI initiator device as the SCSI ID of the SCSI candidate target device during the selection phase.

20. The system of claim 19, wherein the SCSI target device comprises a disk drive.

21. The system of claim 19, wherein the SCSI candidate target device comprises a hard disk drive which includes a hard disk controller (HDC).

22. The system of claim 19, wherein the SCSI initiator device comprises a server.

23. The system of claim 19, further comprising:
  wherein the SCSI candidate target device is further adapted to abort processing associated with the SCSI initiator device by causing a selection timeout for processing to occur.

24. The system of claim 19, wherein the SCSI command comprises a WRITE command.

25. The system of claim 19, wherein the SCSI command comprises a READ command.

26. The system of claim 19, wherein the SCSI candidate target device is further adapted to refrain from processing the SCSI command from the SCSI initiator device if, during the selection phase, no match exists between the SCSI ID of the selected SCSI target device and the SCSI ID of the SCSI candidate target device as identified from the comparing.

* * * * *